No. 679,831. Patented Aug. 6, 1901.
J. T. COWLEY.
BALE OF FIBROUS MATERIAL.
(Application filed July 23, 1900.)

(No Model.)

Witnesses.
Wm. M. Rheem.
Ira D. Perry

Inventor
James T. Cowley.
by Brown and Darby
att'ys

UNITED STATES PATENT OFFICE.

JAMES T. COWLEY, OF LOWELL, MASSACHUSETTS, ASSIGNOR TO THE PLANTERS COMPRESS COMPANY, OF BOSTON, MASSACHUSETTS.

BALE OF FIBROUS MATERIAL.

SPECIFICATION forming part of Letters Patent No. 679,831, dated August 6, 1901.

Application filed July 23, 1900. Serial No. 24,743. (No model.)

*To all whom it may concern:*

Be it known that I, JAMES T. COWLEY, a citizen of the United States, residing at Lowell, in the county of Middlesex and State of Massachusetts, have invented a new and useful Improvement in Bales of Fibrous Material; of which the following is a specification.

This invention relates to an improvement in bales of fibrous material; and its object is to keep the fibers straight and prevent their being interlaced or tangled.

Figure 1:
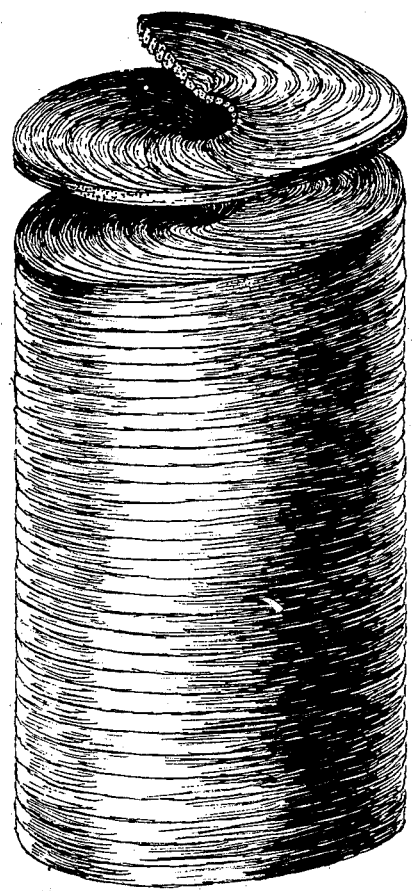
Figure 2:
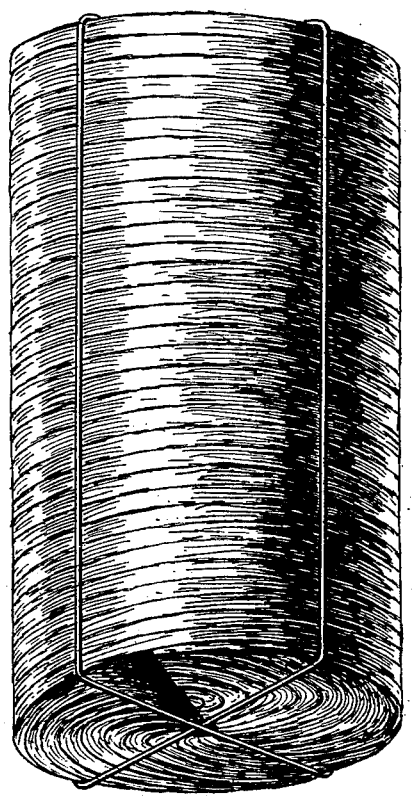
Figure 3:
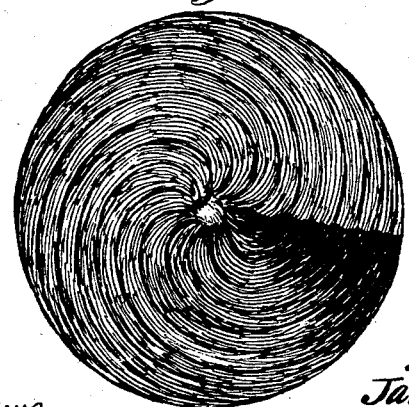

Figure 1 shows a bale of material with wires removed and the bale partly expanded. Fig. 2 is an underneath perspective view of the bale in its wired condition. Fig. 3 is a top or plan view of a bale.

When long fibrous material is baled—such as sisal, hemp, jute, and the like—it is difficult to keep the fibers straight and prevent them from interlacing or tangling, and yet it is highly advantageous that such fibers may be laid into the bale smoothly, so that they will not become tangled and that when the bale is opened such fibers will be substantially parallel. The improved bale forming the subject-matter of this application answers the requirements just referred to as necessary. It is built up of highly-compressed flattened layers, as has heretofore been done; but in addition the material composing these layers is laid in a peculiar manner. Each strand of the material composing such layers or several strands forming a bunch of such material may start at or near the center and gradually work toward the periphery of the bale or may start at or near the periphery and gradually work toward the center of the bale, the several strands or several bunches being laid substantially parallel to each other. In case the several strands or bunches are arranged to form a spiral layer, they will be parallel each to the other and assume the path of a long graceful curve, as is clearly illustrated in Fig. 3 of the drawings. A bale formed in this manner presents the material in a straight and untangled condition, with the fibers substantially parallel, and when the bale is opened for consumption or for any other purpose the material may be removed from the bale in an expeditious manner, for it is only necessary to invert the bale and grasp a handful of the material at the center of the bale, and then with a slight pull a number of bunches are readily removed with the fibers in a straight smooth condition.

Such a bale as is above described may be formed upon a press which will produce a bale composed of flat spirals, and an advantageous press for this purpose is exhibited in the patent granted to George A. Lowry August 8, 1899, No. 630,369. To form the present improved bale on such a press, the end of a strand or one end of a bunch of the material is fed to the slot at or near the center and is gradually worked toward the outer periphery as it passes down into the slot, when it will be seen that the ends which first enter at the center are drawn down into the bale some distance before the outer ends of the bunches or strands have passed through the slot, or the end of each strand or bunch of material is fed to the slot at or near the outer periphery and is gradually worked toward the center as it passes down into the slot.

It is manifest that a bale having the general characteristics described may be made on other forms of presses than the one above referred to.

What I claim, and desire to secure by Letters Patent, is—

1. A bale of fibrous material composed of strands of highly-compressed flattened layers, one end of each of the strands of a layer being located at or near the center, and the other end of each strand located near the outer periphery, the adjacent strands of each layer being approximately parallel to each other, substantially as and for the purpose set forth.

2. A bale of fibrous material composed of highly-compressed flattened layers, each layer consisting of one or more strands, forming a bunch, and one end of each bunch being located at or near the center and the other end near the outer periphery, the adjacent bunches of each layer being approximately parallel to each other, substantially as and for the purpose set forth.

3. A bale of fibrous material composed of highly-compressed flattened layers, each layer consisting of one or more strands, forming a bunch, which starts at or near the center and extends toward the outer periphery, and with the adjacent bunches of each layer substantially parallel to each other, substantially as and for the purpose set forth.

4. A bale of long fibrous material composed of highly-compressed flattened spiral layers, each of which comprises a series of bunches, and each bunch of which starts from at or near the center and extends to or near the outer periphery of the bale in a long curve and approximately parallel to the adjacent bunches in the same layer, substantially as and for the purpose set forth.

In witness whereof I have hereunto set my hand, this 16th day of July, 1900, in the presence of the subscribing witnesses.

JAMES T. COWLEY.

Witnesses:
FREDERIC S. GOODWIN,
WM. M. RHEEM.